US012467799B2

(12) United States Patent
Pariseau (10) Patent No.: US 12,467,799 B2
(45) Date of Patent: Nov. 11, 2025

(54) METHOD AND SYSTEM FOR PROVIDING A THERMOCHROMATIC INDICATION OF A TEMPERATURE CONDITION IN A VESSEL THROUGH CONVECTION

(71) Applicant: Blake Leroy Pariseau, Revere, MA (US)

(72) Inventor: Blake Leroy Pariseau, Revere, MA (US)

( * ) Notice: Subject to any disclaimer, the term of this patent is extended or adjusted under 35 U.S.C. 154(b) by 350 days.

(21) Appl. No.: 18/237,808

(22) Filed: Aug. 24, 2023

(65) Prior Publication Data
US 2024/0027283 A1    Jan. 25, 2024

Related U.S. Application Data

(63) Continuation-in-part of application No. 16/232,595, filed on Dec. 26, 2018, now abandoned.

(51) Int. Cl.
*B65D 51/24* (2006.01)
*B65D 43/02* (2006.01)
*G01K 11/12* (2021.01)

(52) U.S. Cl.
CPC .......... *G01K 11/12* (2013.01); *B65D 43/0202* (2013.01); *B65D 51/245* (2013.01); *B65D 2203/02* (2013.01)

(58) Field of Classification Search
CPC .............. B65D 51/248; B65D 2203/12; B65D 43/0202; B65D 51/245; B65D 2203/02; G01K 1/16; G01K 11/12; G01K 2207/02
See application file for complete search history.

(56) References Cited

U.S. PATENT DOCUMENTS

| | | | | | |
|---|---|---|---|---|---|
| 3,696,675 | A | * | 10/1972 | Gilmour | G01F 23/22 374/162 |
| 5,482,373 | A | * | 1/1996 | Hutchinson | G01K 11/14 374/E11.018 |
| 2008/0084915 | A1 | * | 4/2008 | Gluck | G01K 11/12 374/E11.018 |
| 2009/0183669 | A1 | * | 7/2009 | Scott | G01K 11/16 374/162 |
| 2013/0287986 | A1 | * | 10/2013 | Yamamuro | B41M 5/287 24/3.12 |

* cited by examiner

*Primary Examiner* — Shawn M Braden
(74) *Attorney, Agent, or Firm* — Thomas P. O'Connell; O'Connell Law Firm (57) ABSTRACT

A thermochromatic label system with a vessel, a lid with a lid surface, a thermochromatic label, and a protuberating, preconfigured label retention structure within the lid surface for retaining the thermochromatic label. When applied to the label retention structure, the thermochromatic label indicates a temperature condition of vessel contents through convective heat transfer. The label has a facestock with one or more thermochromatic images. Plural labels can be retained on a release liner, and a removable adhesive permit selective application and removal of the label. The thermochromatic label and the label retention structure can be contoured with corresponding three-dimensional shapes. The three-dimensional shapes could be liquid tight, conical shapes, each with a lower portion, a mid-portion, and a peak portion, and first, second, and third thermochromatic images can be disposed on the respective portions of the facestock.

20 Claims, 5 Drawing Sheets

METHOD AND SYSTEM FOR PROVIDING A THERMOCHROMATIC INDICATION OF A TEMPERATURE CONDITION IN A VESSEL THROUGH CONVECTION

RELATED APPLICATION

This application is a continuation-in-part of U.S. patent application Ser. No. 16/232,595, filed Dec. 26, 2018, which is incorporated herein by reference.

FIELD OF THE INVENTION

The present invention relates generally to the detection of temperature conditions within vessels. More particularly, disclosed and protected herein are a method and system for providing a thermochromatic indication of a temperature condition of contents within a vessel through convection by operation of a thermochromatic indicator applied to a protuberating label retention structure not in physical contact with the vessel contents.

BACKGROUND OF THE INVENTION

The prior art discloses systems and methods capable of providing a reliable and safe indication of the temperature condition of a volume of comestible material retained within a volume of a container. Such methods and devices are intended to apprise a prospective consumer of the approximate or exact temperature condition of the retained material.

Certain prior art systems and methods seek to indicate the overall temperature condition of a retained material, such as by indicating whether a liquid is hot or cold. With this, a user desiring a cold drink, for instance, can be assured that the drink is cold, and a user desiring a hot drink can ensure that the drink is hot. The consumer can, under certain systems of the prior art, be apprised further regarding whether the retained material is in a dangerous or otherwise undesirable temperature condition, such as when a retained drink is not merely hot but too hot to be consumed safely.

Beyond simple hot and cold indications, thermochromatic devices have been disclosed for providing a more exacting indication of temperature. Temperature-indicating devices may seek to provide an exact temperature of a contained material, or such devices may indicate from among a plurality of typically small (i.e., 2-5 degree) temperature ranges.

Many of these prior art devices employ liquid crystal mesophase material that is thermochromatic and which may alternatively be referred to as thermochromic. As the materials's name suggests, thermochromic or thermochromatic material exhibits a change in color in response to a change in temperature. Thermochromic liquid crystal mesophase materials have one or more predetermined active temperature ranges wherein a color change is exhibited to indicate that the mesophase material, and thus the surface or other material with which the mesophase material is in contact, is in that predetermined active temperature range.

The active temperature range of thermochromic liquid crystal material can be calibrated to suit particular requirements or desires. With that, temperature indicating devices are known having a predetermined hot temperature range for actuation, a predetermined cold temperature range for actuation, or some other selected individual, predetermined temperature range. As thermochromic liquid crystal mesophase material passes through its predetermined active temperature range, it exhibits all colors of the visible spectrum in sequence. However, three colors tend to dominate. Brownish-red is typically followed by green, and green is followed by blue.

When it is outside of its active temperature range, liquid crystal mesophase material commonly appears as black against a black background. Exploiting this, prior art devices have interposed black characters, such as characters representative of the active temperature range, between a transparent protective layer and the liquid crystal material. With this, the characters become apparent only when the liquid crystal material is in its active temperature range.

Strips are disclosed with a plurality of sequentially calibrated thermochromic liquid crystal segments, each having numeric characters corresponding to the active temperature range for that segment. With this, the heat condition of material, such as material in a container, can be imparted to the thermochromic strip through conduction whereupon the liquid crystal segment corresponding to the temperature of the contained material will tend to enter its active temperature range.

Many useful temperature-indicating devices exploiting conduction have been provided by the prior art that rely on thermochromic material. Indeed, the present inventor disclosed plural embodiments and methods for employing thermochromic materials actuated through conduction with his own U.S. Pat. No. 6,579,006 to Pariseau ("Pariseau '006") for a Thermochromic Method and Device for Use Relative to a Product Container.

Despite the useful contributions to the state of the art provided by this inventor and other skilled contributors, it has been recognized that there remain a plurality of needs in relation to temperature indicating systems and methods. For instance, it will be understood that many temperature-indicating structures are fixed in a specified location in relation to a particular container to detect heat through conduction. By way of example, thermochromic devices have been built into the sidewalls of cups, bowls, and drink containers. However, fixed thermochromic indicators are disadvantageously inflexible as to their location and relative to the vessel to which they are fixed. Moreover, a thermochromic device fixed in relation to the sidewall of a vessel to detect heat through conduction may be easily concealed, such as by a protective sleeve or by the user's own hand, thereby becoming essentially non-functional. Further, such fixed thermochromic devices are not reusable and cannot be applied to a container of a user's choosing.

Perhaps most notably, one vulnerability of thermochromic indicators operable by conduction, including those disclosed in Pariseau '006, is that their intended functionality, that is the detection of a temperature condition within a vessel through conduction, inherently relies on conductive contact of the thermochromic indicator, directly or through the surface to which it is applied, with the contents of the vessel. Seeking to accomplish this, Pariseau '006 teaches that a thermochromic indicator disposed atop a vessel must be applied to "a depression in the top side of the upper surface of the product container" thereby to cause the lower surface of the depression to dip into physical contact with the vessel contents. However, where the vessel contents do not rise into contact with the inner surface of the depression, whether through some contents being removed, through the vessel not being filled to the expected level, through tilting, or otherwise, the required conductive contact is lost and the operation of the thermochromic indicator is frustrated.

Now recognizing the foregoing, the present inventor has recognized that more reliably operable thermochromic indicators are required for providing an indication of the temperature conditions of the contents of a vessel without regard to the level of the vessel contents in comparison to the location of the thermochromic indicator. The present inventor has further recognized that providing a predesignated location for such a thermochromic indicator atop a vessel, such as on a lid or cap or other top surface, would advantageously allow temperature indications to be provided without regard to the applications of insulator sleeves, hands, or other elements that would obstruct the reading and operation of the temperature indicator. Still further, the present inventor appreciated that it would be advantageous to have a temperature-indicating device that synergistically cooperates with the structure of the vessel to provide effective temperature indication without reliance on direct or derivative conductive contact with the contents of the vessel.

SUMMARY OF THE INVENTION

In view of the inventor's recognition of the limitations of the prior art, including his own Pariseau '006 patent, the present inventor set out with the basic object of providing a thermochromic indication that is more reliably operable in providing an indication of the temperature conditions of the contents of a vessel without regard to the level of the vessel contents in comparison to the location of the thermochromic indicator.

A further object of embodiments of the invention is to provide a predesignated location for a thermochromic indicator atop a vessel thereby to allow temperature indications to be provided without regard to obstructions applied to the side of the vessel, such as through the applications of insulator sleeves, hands, or other elements.

Another object of embodiments of the invention is to provide a temperature-indicating device that cooperates with the structure of the vessel in a synergistic manner to provide effective temperature indication without reliance on direct or derivative conductive contact with the contents of the vessel.

In certain embodiments, an additional or alternative object of the invention is to provide a thermochromic temperature-indicating device that can be selectively applied by a manufacturer, at a point-of-sale establishment, by a consumer directly, or otherwise to a vessel that retains or is designed to retain comestibles in a desired temperature condition.

Another object of the invention is to provide a thermochromic device that can enhance consumer safety by apprising the user of a temperature condition of a retained drink or other comestible without reliance on direct or derivative contact between the thermochromic device and the vessel contents.

Embodiments of the thermochromic device have the further object of being reusable.

A further object of embodiments of the invention is to provide a thermochromic device founded on a substrate material and with applied image material, such as thermochromic and non-thermochromic material, that can be recycled in an environmentally-sound manner.

Additional objects and advantages of the present invention will be obvious both to one who reads this specification and reviews the accompanying drawings and to those who have an opportunity to make use of an embodiment of the thermochromatic device disclosed herein. Although the accomplishment of each of the foregoing objects in a single embodiment of the invention may be possible and even preferred, not all embodiments will seek or need to accomplish each and every potential object and advantage. Nonetheless, all such embodiments should be considered within the scope of the invention.

In accomplishing the aforementioned objects, one embodiment of the invention can be characterized as a thermochromatic label system for providing an indication of a temperature condition of contents of an inner volume of a vessel through convective heat transfer. The thermochromatic label system comprises a thermochromatic label with a facestock having a first surface comprising a thermochromatic display surface and a second surface. A pattern of adhesive is disposed on the second surface of the facestock, and a thermochromatic image is disposed on the thermochromatic display surface of the facestock. The thermochromatic image is formed with a thermochromatic material with an active temperature range. A vessel has an inner volume for retaining vessel contents in a temperature condition, and a lid for the vessel has a lid surface and a protuberating, preconfigured label retention structure within the lid surface for retaining the thermochromatic label. The label retention structure comprises a raised protuberance on the lid that defines a raised sub-volume within the lid and above the inner volume of the vessel when the lid is applied to the vessel. Under this construction, the temperature condition of the vessel contents can be sensed and indicated by the thermochromatic label through convection without requiring direct or derivative conductive contact between the vessel contents and the thermochromatic label.

In certain embodiments, the protuberating, preconfigured label retention structure is contoured with a substantially conical shape, and the raised sub-volume defined by the label retention structure is liquid tight with the lid surface. The facestock of the thermochromatic label can then have a lower portion, a mid-portion, and a peak portion, and the thermochromatic label can be adapted to be applied to the substantially conical shape of the protuberating, preconfigured label retention structure. The label can have a first thermochromatic image disposed on the peak portion of the facestock and a second thermochromatic image disposed on the lower portion of the facestock. In such practices, the first thermochromatic image can be formed from a thermochromatic material with a first temperature range while the second thermochromatic image can be formed from a thermochromatic material with a second temperature range. The first and second temperature ranges can be substantially the same or different.

Where the protuberating, preconfigured label retention structure is contoured with a substantially conical shape, the facestock of the thermochromatic label can likewise be contoured with a three-dimensional conical shape for being applied over the conical shape of the label retention structure. In certain practices of the invention, the three-dimensional conical shape of the facestock of the thermochromatic label is liquid tight.

It is also disclosed herein that the thermochromatic label can have a size and a peripheral edge shape and that the label retention structure can have an upper portion with a size and peripheral shape in approximate correspondence to the size and peripheral edge shape of the thermochromatic label. For instance, the peripheral shapes can be rectangular. The label retention structure has a peripheral wall portion that raises the upper portion above the lid surface.

According to the invention, the lid can comprise a fixed top of the vessel, such as but not limited to the top of a beverage can or the top of any other vessel with a fixed top. In other practices of the invention, the lid comprises a selectively attached top for the vessel, such as the lid of a coffee cup or other vessel with a removable and replaceable top.

Alternatively described, a most basic embodiment of the invention again comprises a thermochromatic label system for providing an indication of a temperature condition of contents of an inner volume of a vessel. The thermochromatic label system is founded on a thermochromatic label. The label has a facestock with a first surface comprising a thermochromatic display surface and a second surface. A pattern of adhesive is disposed on the second surface of the facestock, and a thermochromatic image is disposed on the first surface of the facestock. The thermochromatic image is formed by a thermochromatic material with an active temperature range. So constructed, the thermochromatic label can be automatically or selectively applied to a vessel, such as by application to a lid of a vessel. The facestock, the thermochromatic material, and the adhesive can, in certain practices, be recyclable in an environmentally-sound manner.

The thermochromatic label system can further include a release liner releasably coupled to the thermochromatic label. With that, the thermochromatic label can be released from the release liner and applied to a vessel. Release of the label from the release liner and application to a vessel, such as to a lid of a vessel, can be done manually by a user or, as disclosed herein, by a release and application system operative automatically under computer programming.

According to the invention, plural thermochromatic labels may be disposed on the release liner. By way of example and not limitation, plural thermochromatic labels can be retained in series on the release liner.

Embodiments of the thermochromatic label system can further include one or more static image displays on the first surface of the facestock. Moreover, the first surface of the facestock can include plural thermochromatic images, which can have the same or different active temperature ranges.

In certain practices of the invention, the adhesive disposed on the second surface of the facestock can be a removable adhesive. With that, the thermochromatic label can be applied to and removed from one or more vessels and in relation to selected locations on vessels.

The thermochromatic label system can further include a lid of a vessel. The lid can have a preconfigured label retention structure for retaining the thermochromatic label. By way of example, the label retention structure can be a raised protuberance on the lid that defines a raised sub-volume within the lid. In particular manifestations, the facestock has a size and a peripheral shape, and the label retention structure has a size and peripheral shape in approximate correspondence to the size and peripheral edge shape of the facestock. By way of example, the facestock could be rectangular and the raised label retention structure can have a rectangular shape to define a raised, box-shaped sub-volume within the lid.

Further, where the thermochromatic label system includes a lid of a vessel with a preconfigured label retention structure for retaining the thermochromatic label, the label retention structure can be formed to include a raised protuberance on the lid that defines a raised sub-volume within the lid that is contoured with a three-dimensional shape corresponding to a three-dimensional shape of the facestock.

In particular embodiments, for instance, the facestock is contoured with a substantially conical shape with a lower portion, a mid-portion, and a peak portion, and the raised protuberance is contoured with a substantially conical shape corresponding to the substantially conical shape of the facestock. A first thermochromatic image can be disposed on the peak portion of the facestock and a second thermochromatic image can be disposed on the lower portion of the facestock. Under such constructions, the first thermochromatic image can be formed from a thermochromatic material with a first temperature range and a second thermochromatic image can be formed from a thermochromatic material with a second temperature range. Those first and second temperature ranges could be substantially the same with the first and second thermochromatic images having different display temperature characteristics dependent on their respective heights within the protuberance, or the first and second temperature ranges could be different.

The image displays can be formed in any one of a number of ways that would occur to one skilled in the art. For example, non-thermochromic images can be formed with any one of a variety of readily available materials including paints, inks, films, and decals. U.S. Pat. No. 5,265,532, which is incorporated herein by reference, provides a detailed description of some possible application methods and materials. The thermochromatic image displays can be formed from a variety of thermochromatic materials including thermochromic liquid crystal material and thermochromic ink. One knowledgeable in the art will appreciate that typical thermochromic inks are founded on the combination of an electron-donating color forming material and an electron-accepting color developing material. Further background may be had to U.S. Pat. Nos. 4,028,118 and 4,732,810, which are incorporated herein by reference. In any case, one skilled in the art will be aware that any one of a variety of methods, such as painting, coating, spraying, dipping, marking, screen printing, offset printing, and gravure printing could be exploited alone or in combination. The preferred thermochromatic materials will be color reversible whereby the created device could be used repeatedly where appropriate.

The foregoing discussion broadly outlines the more important features of the invention merely to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

Methods and systems for providing a thermochromatic indication of a temperature condition of contents within a vessel through convection by operation of a thermochromatic indicator applied to a protuberating label retention structure not in physical contact with the vessel contents according to the present invention could pursue widely varied embodiments. However, to ensure that one skilled in the art will be able to understand and, in appropriate cases, practice the invention, certain preferred embodiments of the broader invention revealed herein are described below and shown in the accompanying drawing figures. These embodiments are not intended to be limiting.

Figures 1, 2:
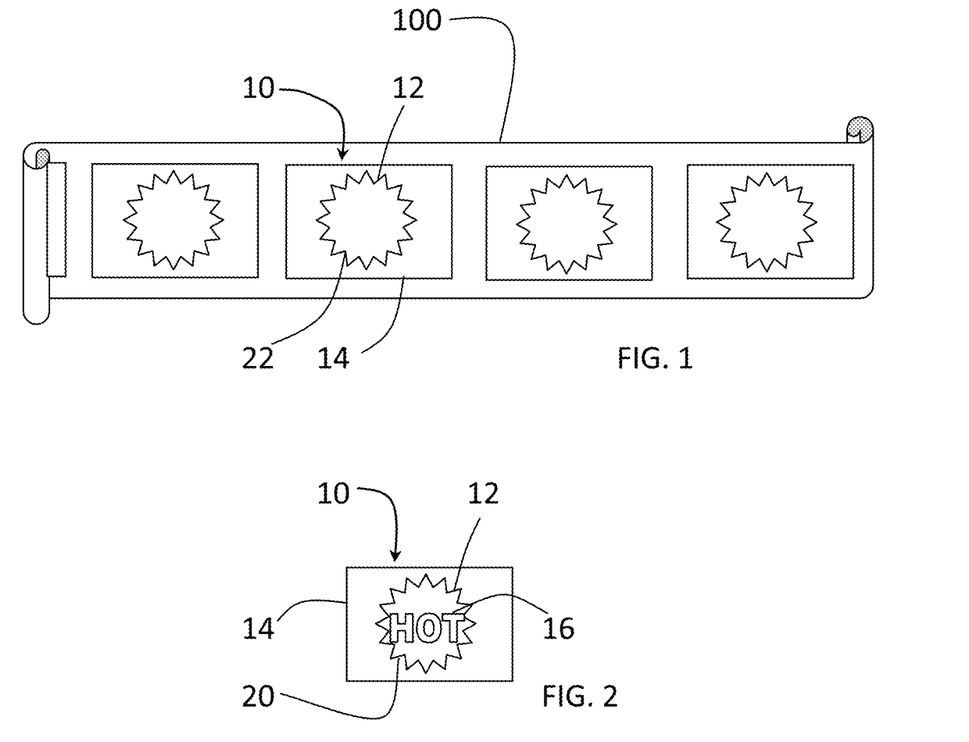
FIG. 1 is a top plan view of a strip of thermochromatic labels according to the invention disclosed herein, the thermochromatic labels in a first temperature condition.
FIG. 2 is a top plan view of a thermochromatic label according to the invention in a second temperature condition.

Turning more particularly to the accompanying drawing figures, a thermochromatic label according to the invention is indicated generally at 10 in FIG. 1. There, the thermochromatic label 10 is depicted as retained on a release liner 100 together with a plurality of other, similarly constructed thermochromatic labels 10. Each thermochromatic label 10 is founded on a panel of facestock 14 with a thermochromatic display surface 12 comprising a first surface thereof. The shape, size, and design of the thermochromatic display surface are not intended to be limited herein except as may expressly be provided by the claims.

Where thermochromatic labels 10 are retained on a release liner 100, the thermochromatic labels 10 can be retained with the thermochromatic display surface 12 facing outwardly and with a second, opposite surface of the labels 10 in facing contact with the release liner 100. The thermochromatic labels 10 and the release liner 100 can be disposed in a variety of possible forms. For instance, thermochromatic labels 10 can be disposed in roll form with a plurality of thermochromatic labels 10 releasably retained in series on a strip of release liner 100. In other practices within the scope of the invention, thermochromatic labels 10 can be disposed in sheet form with a plurality of thermochromatic labels 10 disposed in an array on a sheet of release liner 100. Other formats and combinations of formats for releasably retaining thermochromatic labels 10 are possible and within the scope of the invention.

In FIG. 1, the several thermochromatic labels 10 are disposed in series along a strip of release liner 100 such that the thermochromatic labels 10 can be retained in roll form. The thermochromatic labels 10 can be released from the liner 100, whether manually or mechanically as disclosed herein. Once released from the release liner 100, the thermochromatic labels 10 can be selectively applied to any desired location of any vessel. The vessel can have an inner volume that can be employed, for instance, to retain a volume of a beverage, a foodstuff, or any other material. As in FIG. 5 by way of example and not limitation, a thermochromatic label 10 removed from the release liner 100 can be applied to a vessel 300 by application to a lid 200 of the vessel 300 to detect the temperature condition of the contents of the vessel 300 through convection without a requirement for direct or derivative conductive contact with the vessel contents.

The thermochromatic label 10 is shown in a first temperature condition in FIG. 1. The first temperature condition can, for instance, be a temperature condition not exceeding a typical ambient temperature condition. As a non-limiting, merely illustrative example, the first temperature condition can be a temperature condition not exceeding approximately 120 degrees Fahrenheit (49 degrees Celsius). When in the first temperature temperature condition, the thermochromatic label 10 exhibits a first image display on the thermochromatic display surface 12, indicating to the observer that the thermochromatic label 10 is in the first temperature condition. The first image display can be a static image display 22. The static image display 22 can be formed, for instance, by a fixed image application method, such as printing, embossing, or any other image application method or combination thereof on the thermochromatic display surface 12.

The thermochromatic label 10 is shown in a second temperature condition in FIG. 2. The second temperature condition can, for instance, be a temperature condition within a given temperature range in excess of the first temperature condition. For instance, the second temperature condition can be a temperature condition exceeding approximately 120 degrees Fahrenheit (49 degrees Celsius) but not greater than approximately 160 degrees Fahrenheit (71 degrees Celsius). When in the second temperature condition, the thermochromatic label 10 exhibits a second image display, indicating to the observer that the thermochromatic label 10 is in the second temperature condition. The second image display can, for instance, be a combination of the first image display and a thermochromatic image 16 induced by entry into the second temperature condition. Here, the thermochromatic image 16 of the second image display includes the word HOT, indicating that the thermochromatic label 10 is second, elevated temperature condition.

Figure 3:
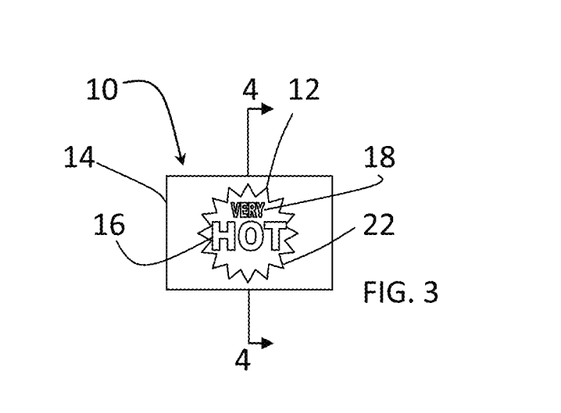
FIG. 3 is a top plan view of the thermochromatic label of FIG. 2 in a third temperature condition.

The thermochromatic label 10 is shown in a third temperature condition in FIG. 3. The third temperature condition can, for instance, be a temperature condition in excess of the second temperature condition. For instance, the third temperature condition can be a temperature condition exceeding approximately 160 degrees Fahrenheit (71 degrees Celsius). When in the third temperature condition, the thermochromatic label 10 exhibits a third image display, indicating to the observer that the thermochromatic label 10 is in the third temperature condition. The third image display can, for instance, be a combination of the static image display 22, the thermochromatic image 16 of the second image display, and a thermochromatic image 18 induced by entry into the third temperature condition. Here, the thermochromatic image 18 of the third image display includes the word VERY, indicating, together with the thermochromatic image 16 of the second image display, that the thermochromatic label 10 is in the third, further elevated temperature condition.

Figure 4:
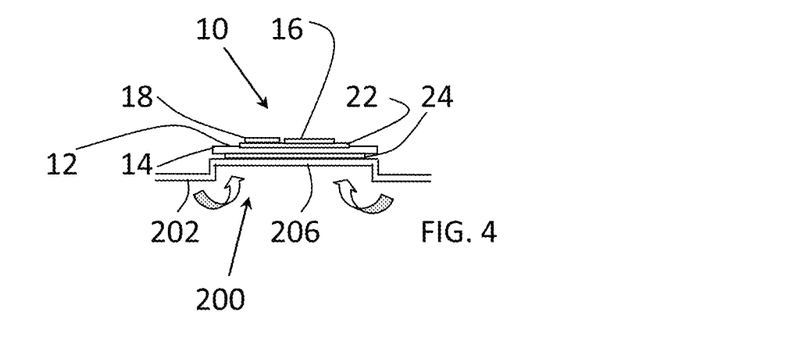
FIG. 4 is a cross-sectional view of a thermochromatic label taken along the line 4-4 in FIG. 3, the thermochromatic label applied to a lid of a vessel to detect temperature condition by convection.
Figure 5:
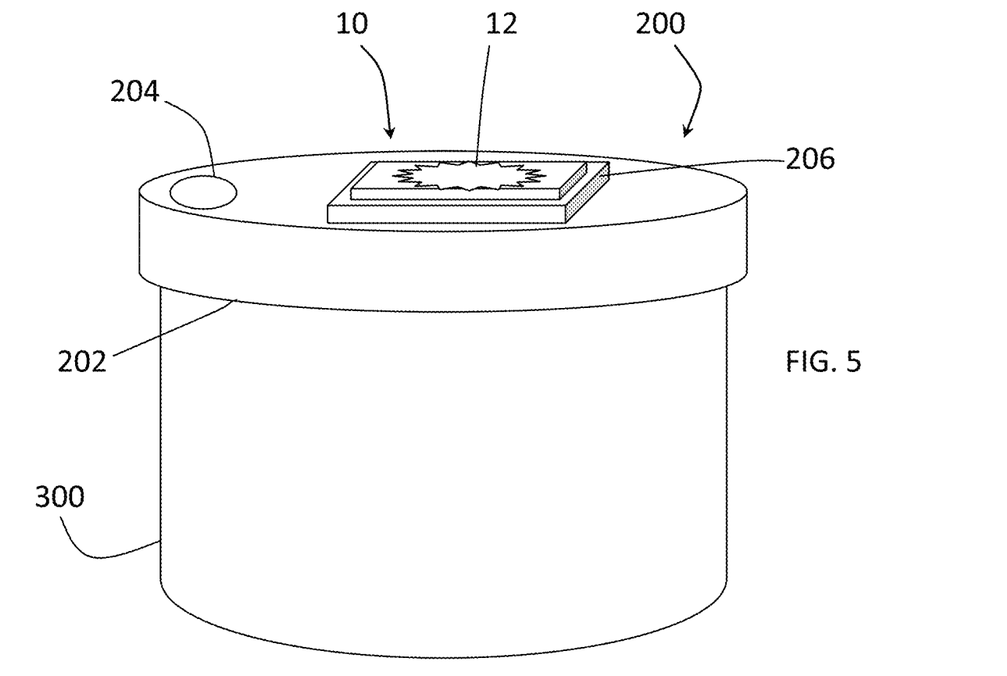
FIG. 5 is a perspective view of a vessel lid retaining a thermochromatic label pursuant to the present invention.

FIG. 4 shows the thermochromatic label 10 in a cross-sectional view taken along the line 4-4 in FIG. 3. In FIGS. 4 and 5, the thermochromatic label 10 is applied to a protuberating, preconfigured, predetermined label retention structure 206 of a lid structure 202 of a lid 200 for a vessel 300 such that the temperature condition of the contents of the vessel 300 can be sensed and indicated through convection without direct or derivative conductive contact between the vessel contents and the thermochromatic label 10. As used herein, the term "derivative conductive contact" should be interpreted to mean contact where there is direct contact with contents of a vessel 300 and a material or layered materials of the vessel 300 and the thermochromatic label 10 thereby to enable thermal contact conductance. In the depicted embodiment, the vessel 300 is a drinking vessel 300 with a sipping orifice 204 in the lid structure 202.

As is illustrated in FIG. 4 and again with reference to FIG. 1, the thermochromatic label 10 of the present embodiment is founded on a panel of facestock 14. The facestock 14 has a first surface forming the thermochromatic display surface 12 and a second, opposite surface retaining a pattern of adhesive 24. On initial manufacture, the thermochromatic label 10 is removably adhered to the release liner 100 by the adhesive 24. The adhesive 24 can be a permanent adhesive so that a label 10, once applied, is fixed in place. Alternatively, in certain preferred embodiments, the adhesive 24 can be a removable adhesive such that labels 10 can be applied, removed, reused, repositioned, and recycled. Numerous removable adhesive compositions would be known to one of ordinary skill in the art in view of the present disclosure.

The thermochromatic images 16 and 18 and the fixed display image 22 are applied to the facestock 14 to be visible from the first surface side of the facestock 14. The fixed image display 22 could, by way of a non-limiting example, be a non-thermochromic layer of ink, embossing, or other static imaging that would be constantly visible. The first and second thermochromatic images 16 and 18 could be patterns of thermochromatic material applied by any effective method to the first surface of the facestock 14. The thermochromatic image 16 of the second image display is calibrated to become visible when the thermochromatic label 10 is in the second temperature condition, and the thermochromatic image 18 of the third image display is calibrated to become visible when the thermochromatic label 10 is in the third temperature condition. The thermochromatic material could, by way of example and not limitation, be a thermochromatic ink, thermochromatic liquid crystal material, thermochromatic ink or pigment, or any other thermochromatic material that now exists or is hereafter developed.

The foregoing are merely illustrative examples of possible temperature ranges. The active temperature ranges can be varied based, for example, on the food or liquid to be retained, based on consumers' expected desires, and, additionally or alternatively, based on a number of other factors. For example, thermochromatic labels 10 for use with beverages and foods best served cold could have image displays with active temperature ranges at and below room temperature. Still further, thermochromatic labels 10 could be created with one or more thermochromatic image displays having active temperature ranges well above room temperature and with one or more thermochromatic image displays having active temperature ranges well below room temperature. Such a thermochromatic label 10 could be used relative to beverages, such as coffee, that could be served iced just as well as hot.

It will be understood that further or fewer thermochromatic and static images 16, 18, and 22 could be employed, depending for instance on the particular application. Moreover, static and thermochromatic images 22, 16, and 18 can overlap and need not necessarily be applied to physically distinct areas of the thermochromatic label 10.

As shown in FIG. 5, the thermochromatic label 10 can be removed from the release liner 100 and then applied to a lid 200 of the vessel 300 so that the temperature condition of the label 10 as indicated by the thermochromatic image displays will give an indication of the temperature of the contents of the vessel 300. Based on its flexibility, the thermochromatic label 10 can be applied in any desired location on any vessel 300. Advantageously, by application to the lid 200 of the vessel 300, the thermochromatic label 10 is operative to detect the temperature condition of the contents of the vessel 300 through thermal convection without a requirement for physical contact between the thermochromatic label 10 or the material of the lid 200 and the contents of the vessel 300.

The facestock 14, the thermochromatic material of the thermochromatic images 22, 16, and 18, the printing material of any non-thermochromatic images, and the adhesive 24 can each be formed of a recyclable material. Under such constructions, the labels 10 can be disposed of or recycled in an environmentally-sound manner.

Referring again to FIGS. 4 and 5 where the thermochromatic label 10 is applied the lid 200 of the vessel 300, the lid 200 can again be seen to have a lid surface and a protuberating, preconfigured label retention structure 206 within the lid surface. This is in diametric opposition to the concave depression taught by Pariseau '006. The protuberating, preconfigured label retention structure 206 in FIGS. 4 and 5 comprises a raised platform in the body structure 202 of the lid 200. When the lid 200 is retained relative to the vessel 300, the label retention structure 206 defines a raised sub-volume that rises above the inner volume of the vessel 300 out of physical contact with the contents of the vessel 300. In this embodiment, the label retention structure 206 has an upper portion with a size and peripheral shape in approximate correspondence to the size and peripheral edge shape of the thermochromatic label 10 and a peripheral wall portion that raises the upper portion above the surrounding portion of the surface of the lid 200. More particularly, the thermochromatic label 10 in this example is rectangular, and the upper portion of the raised label retention structure 206 has a corresponding rectangular shape while the peripheral wall portion has a rectangular shape in lateral cross section. With that, the label retention structure 206 defines a raised, box-shaped sub-volume that rises above the inner volume of the vessel 300.

With such a label retention structure 206 defined and the thermochromatic label 10 applied thereto, whether by a user selectively or by a label application mechanism automatically, the thermochromatic label 10 will tend to be heated or cooled through thermal convection depending on the heating or cooling of the inner volume of the vessel 300 without a requirement for direct or derivative conductive contact between the upper portion of the protuberating label retention structure 206 and the vessel contents. The thermochromatic characteristics of the label 10 can thus be consistently and accurately actuated substantially without regard to the level to which the vessel 300 is filled. This, again, is in marked differentiation from the need for physical conductive contact taught by Pariseau '006, the dependence on that contact introducing an unreliability not present in practices of the present invention.

Thus, while thermochromatic articles affixed, for instance, to the side of a vessel will tend to be heated or cooled by the process of conduction as the contents of the vessel directly contact the wall of the vessel and the wall of the vessel directly contacts the thermochromatic article, the present thermochromatic label 10 will tend to be heated or cooled by the process of convection. Air above the contents of the vessel 300 will tend to be heated or cooled thereby heating or cooling the lid 200 and the thermochromatic label 10. Moreover, where the label retention structure 206 defines a protuberating sub-volume in the lid 200 of the vessel 300, heat retained by the gas above the contents of the vessel 300 will tend to rise into the sub-volume defined by the label retention structure 206 thereby further enhancing the ability of the label 10 to give a consistent indication of the temperature condition of the contents of the vessel 300.

Other configurations of thermochromatic labels 10 and, additionally or alternatively, label retention structures 206 for thermochromatic labels 10 are contemplated. It is alternatively possible, for instance, for thermochromatic labels 10 according to the invention to pursue contoured, three-dimensional shapes. In such practices of the invention, the label retention structures 206 could have contoured, three-dimensional shapes corresponding to the contoured, three-dimensional shape of the thermochromatic labels 10. Being retained relative to a vessel 300 designed to hold liquid, solid, or combined liquid and solid substances, such as comestibles, the structure of the contoured, three-dimensional shape of the label retention structure 206 is preferably fluidically sealed in and of itself and in relation to the surrounding portion of the lid 200 such that the label retention structure 206 is liquid tight thereby preventing liquid, gas, or other leakage out of or into the raised inner volume of the label retention structure 206.

Figure 6:
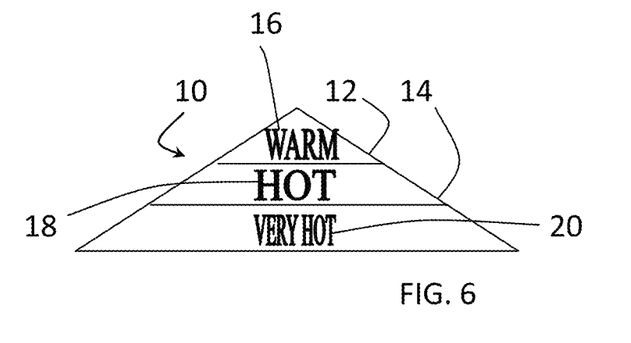
FIG. 6 is a perspective view of a contoured thermochromatic label pursuant to an embodiment of the invention.
Figure 7:
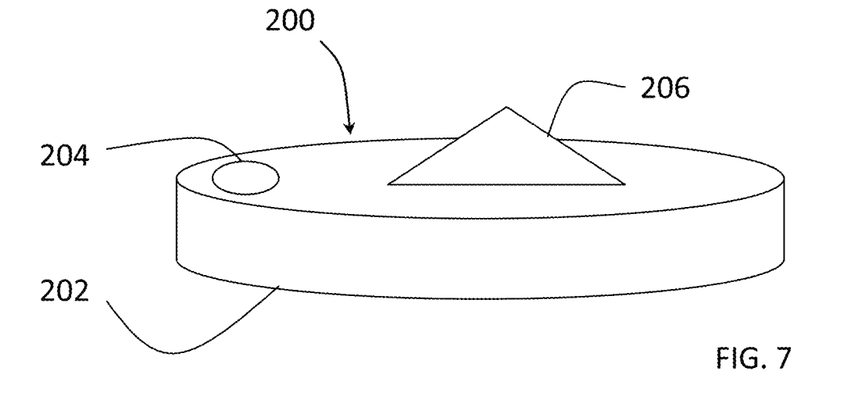
FIG. 7 is a perspective view of a vessel lid with a contoured label engaging portion corresponding to the contoured thermochromatic label of FIG. 6.
Figure 8:
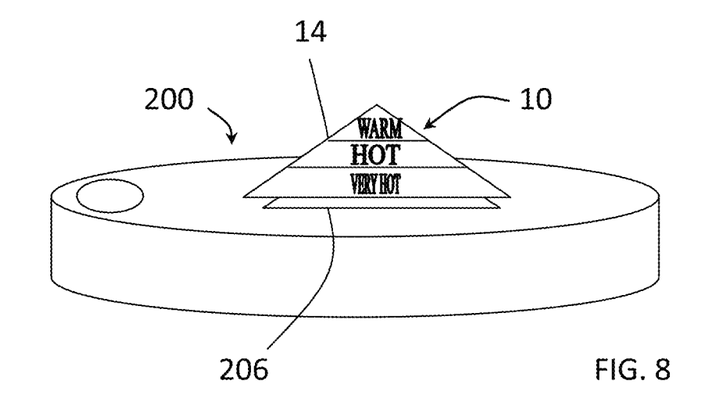
FIG. 8 is a perspective view of the vessel lid of FIG. 7 retaining the contoured thermochromatic label of FIG. 6.

The thermochromatic label 10 and the label retention structure 206 in FIGS. 6 through 8, for instance, have corresponding, contoured, non-flat shapes with the label retention structure 206 and the thermochromatic label 10 applied thereto bounding a liquid-tight inner sub-volume. More particularly, the thermochromatic label 10 and the label retention structure 206 have substantially conical shapes whereby each bounds a liquid-tight conical inner sub-volume that has a lower portion, a mid-portion, and a peak portion. Other shapes for the thermochromatic label 10 and the label retention structure 206 having a lower portion, a mid-portion, and a peak portion defining a liquid-tight inner sub-volume are possible within the scope of the invention except as it might be expressly limited by the claims.

Having such portions, the thermochromatic label 10 has a first thermochromatic image 16 disposed on the peak portion of the facestock 14 of the label 10, a second thermochromatic image 18 disposed on the mid-portion of the facestock 14 of the label 10, and a third thermochromatic image 20 disposed on the lower portion of the facestock 14 of the label 10. The first thermochromatic image 16 is adapted to indicate a first temperature condition, indicated here by the term WARM becoming visible when the peak portion is heated to the active range of the thermochromatic material of the first thermochromatic image 16. The second thermochromatic image 18 is adapted to indicate a second temperature condition, indicated here by the term HOT becoming visible when the mid-portion is heated to the active range of the thermochromatic material of the second thermochromatic image 18. The third thermochromatic image 20 is adapted to indicate a third temperature condition, indicated here by the terms VERY HOT becoming visible when the lower-portion is heated to the active range of the thermochromatic material of the third thermochromatic image 20. The lid 200 and the materials applied thereto can undergo reversible heating processes such that the lid 200 and the vessel 300 could be heated as necessary, such as by microwave heat or otherwise.

With the protuberating label retention structure 26 retained atop a vessel 300 and with the label 10 applied to the label retention structure 26, the label retention structure 26 and the thermochromatic label 10 will tend to project upwardly from the body portion 202 of the lid 200. The first thermochromatic image 16 will tend to be disposed above the second thermochromatic image 18, and the second thermochromatic image 18 will tend to be disposed above the third thermochromatic image 20. Based on the principles of convection, the images 16, 18, and 20 will tend to experience increased rising heat with each succeeding rise in elevation above the inner volume of the vessel 300. The first thermochromatic image 16 should experience the highest convective transfer of heat. The second thermochromatic image 18 should experience the second highest convective transfer of heat, and the third thermochromatic image 20 should experience the third highest convective transfer of heat.

The thermochromatic images 16, 18, and 20 are calibrated to become active dependent on their relative vertical positions with respect to the thermochromatic label 10 and, when applied to a vessel 300, with respect to the protuberating label retention structure 206 and the vessel 300 in general. It is contemplated, for instance, that it may be possible to employ thermochromatic material for the thermochromatic images 16, 18, and 20 with overlapping or even matching active temperature ranges while having the images 16, 18, and 20 demonstrate distinguishable active states dependent on their relative vertical positions with respect to the thermochromatic label 10 and, when applied to a vessel 300, with respect to the protuberating label retention structure 206 and the vessel 300 in general. Stated alternatively, since the second thermochromatic image 18 is disposed below the first thermochromatic image 16 in practice, the second thermochromatic image 18 may require a higher temperature within the vessel 300 to become active as compared to the first thermochromatic image 16, and the third thermochromatic image 20 may require a higher temperature than the first and second thermochromatic images 16 and 18.

Where the thermochromatic label 10 has a contoured, three-dimensional shape as in FIGS. 6 through 8, the contouring could be produced by a number of different methods. By way of non-limiting example, the thermochromatic label 10 might be formed to have a contoured shape, such as to define a sub-volume with a peak portion, a mid-portion, and a lower portion, by a molding process or in some other manner to produce a selectively applied label 10. The contoured shape of the thermochromatic label 10 can be liquid tight according to the invention. In such embodiments, the labels 10 can again be disposed with a release liner 100. Each label 10 can have its own separate release liner 100, or a single release liner 100 might again retain plural thermochromatic labels 10.

Figure 9:
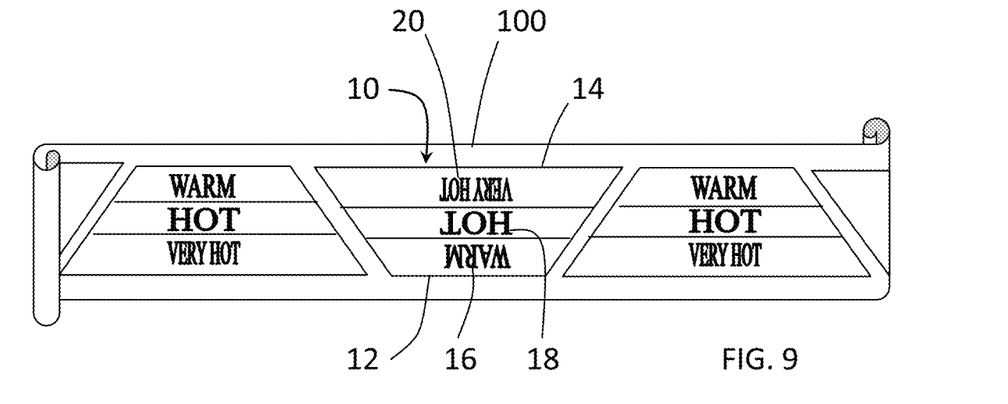
FIG. 9 is a top plan view of a strip of an alternative embodiment of thermochromatic labels according to the present invention.

It is further contemplated that thermochromatic labels 10 as disclosed herein could be initially disposed in a flat configuration to be formed into a contoured configuration during application to a vessel 300. For example, as FIG. 9 shows, thermochromatic labels 10 could be formed with a facestock 14 having a trapezoidal peripheral shape with a narrow portion, a mid-portion, and a wide portion. The labels 10 in FIG. 9 have a first thermochromatic image 16 formed on the narrow portion, a second thermochromatic image 18 formed on the mid-portion, and a third thermochromatic image 20 formed on the wide portion. The thermochromatic images 16, 18, and 20 are indicative of first, second, and third temperature ranges of increasing temperature, such as WARM, HOT, and VERY HOT. Under this construction, the trapezoidal thermochromatic label 10 can be formed into a conical or frusto-conical shape and applied to a vessel 300, such as to a protuberating, conical or raised arcuate label retention structure 206 of a lid 200 of a vessel 300.

Thermochromatic labels 10 as disclosed herein could be applied to any container that retains a product the temperature of which may be desirable to ascertain. The vessel 300 shown herein is merely an illustrative example. Labels 10 according to the invention are not limited with respect to the number of image displays or with regard to the nature and breadth of their active temperature ranges. Just one thermochromatic image display might be provided as could a plurality of thermochromatic image displays with distinct or overlapping active temperature ranges whereby contents of a vessel 300 could be indicated to be warm, hot, or very hot or to be cool, cold, or very cold. Thermochromatic image displays need not explicitly indicate temperature but could instead be merely decorative.

Figure 10:
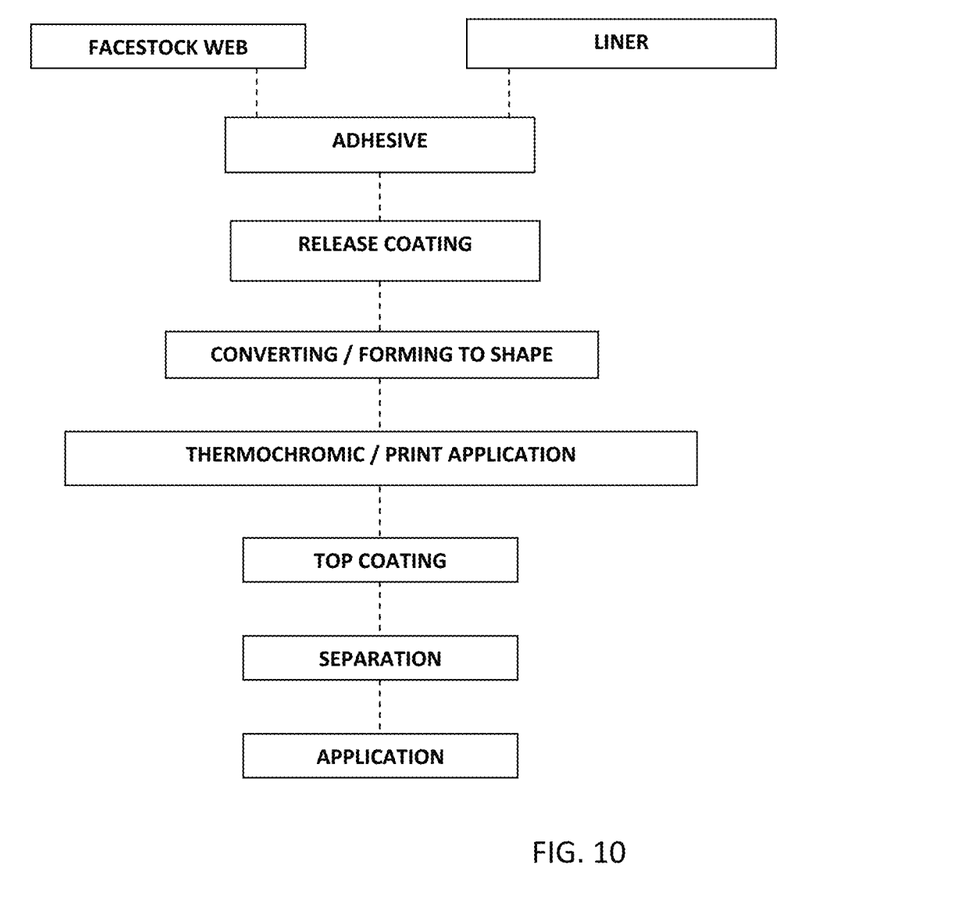
FIG. 10 is a chart of potential steps in the formation and application of thermochromatic labels according to a possible manifestation of the invention.

FIG. 10 provides a non-limiting illustration of possible steps in label production, those steps not necessarily in the order depicted. The production process might begin, for instance with providing a facestock web for ultimately acting as the facestock 14 and a liner web for ultimately acting as the release liner 100. The facestock web may be a web of paper, plastic, or another material or combination of materials of a desired weight depending on, for instance, the expected application. The facestock web is simultaneously or progressively acted on, such as by a press with die cutting, extrusion, and other attachments. The facestock web can be sequentially or continuously moved in a web direction, and a pressure sensitive or other adhesive can be applied to a face of the facestock web, such as with an extrusion die. A variety of pressure sensitive adhesives could be used. The adhesive can be a permanent adhesive so that a label 10, once applied, is fixed in place, or the adhesive can be a removable adhesive such that labels 10 can be applied, removed, reused, repositioned, and recycled. A release material, such as a pattern of silicone release material, can be applied, such as to the same face as that to which the adhesive was applied. Additionally or alternatively, release material may be applied to the liner web.

In certain practices, a curing stage may be provided for the adhesive and, additionally or alternatively, the release material. Individual labels are cut and formed to shape, or converted, by one or more effective cutting and forming processes, such as by die cutting, slitting, stamping, and wet or dry forming. The liner web and the labels converted from the facestock web are coupled in a facing relationship so that the labels have a first surface forming the thermochromatic display surface 12 and a second, opposite surface retaining a pattern of adhesive 24 and in contact with the release liner 100 so that the thermochromatic label 10 is removably adhered to the release liner 100 by the adhesive. Before or after one or more of these steps, one or more thermochromatic images 16, 18, and 20 and the fixed display image 22 are applied to the facestock 14, such as by printing or otherwise, to be visible from the first surface side of the facestock 14.

Once the thermochromatic labels 10 are formed, the method of applying the thermochromatic labels 10 to a vessel 300 can include releasing a given thermochromatic label 10 from the release liner 100 and applying the label 10 to a protuberating label retention structure 206 of the vessel 300. Removal and application of the thermochromatic labels 10 can be carried out manually. Alternatively, as disclosed herein, thermochromatic labels 10 can be automatically removed from release liner 100 and applied to a lid 200 of a vessel 300 in an automated release and application process by release and application machinery constructed and operated, such as by computer programming, to accomplish the release and application process. The release and application process and machinery can remove the thermochromatic label 10 from the release liner 100 and then apply the label 10 to the protuberating label retention structure 206 of the lid 200 in an automated process or series of subprocesses.

The foregoing is not intended to, and shall not, limit the method for forming the labels 10 except as the claims may expressly specify. Different and fewer or additional materials and steps may be employed. The steps and the order of steps in the production of thermochromatic labels 10 can vary within the scope of the invention. Moreover, it should be understood that relative spatial terms, terms of direction, and terms of relative positioning, such as "top," "middle," "bottom," "above," "below," and any other such or similar terms used herein are used to enable a fuller, accurate understanding of the disclosed invention and are based on a vessel 300, lid 200, and thermochromatic label 10 disposed in a vertically upright condition, even in view of the knowledge that the vessel 300, the lid 200, and the label 10 could be sold, transported, or otherwise disposed or viewed in conditions other than vertically upright.

The thermochromatic labels 10 disclosed herein achieve a plurality of advantages. For instance, thermochromatic labels 10 are readily applied to and, potentially such as where a removable adhesive 24 is used, removed from a given vessel 300. Such labels 10 can be selectively applied, repositioned, recycled, and reused. Labels 10 can be interchanged between vessels 300. Labels 10 as disclosed herein can be applied to any lid 200 and any vessel 300, including disposable plastic lids 200 and vessels 300, but may be considered to have particularly advantageous function in relation to vessels 300 configured as disclosed herein. Labels 10 can be applied for optimal location based on the vessel 300 at hand and the goals of the user.

While the performance of prior art thermochromatic devices applied, for example, to the sidewall of a vessel may be hampered by being obscured by a hand of a user or an insulative sleeve or through lack of direct or derivative conductive contact with the contents of the vessel, the present thermochromatic labels 10 can be applied to a protuberating label retention structure 26 retained atop a vessel 300 to detect temperature conditions through convective heat transfer. The thermochromatic labels 10 and the protuberating label retention structure 26 thus enable consistently visible, predictable, and consistent performance. The thermochromatic label 10 and the protuberating label retention structure 26 thereby act as a consumer safety and protection mechanism and a measure of added convenience. A visual indication of the temperature condition of the contents of a vessel 300 can be had thereby eliminating a need for invasively testing the vessel 300 or its contents and acting as a measure of defense against the consumption of liquid and foodstuffs that are in hazardous or otherwise undesirable temperature conditions.

The thermochromatic label system and method disclosed herein have been shown and described with reference to certain preferred embodiments that merely exemplify the broader invention revealed herein. Those skilled in the art can conceive of alternative embodiments while not incorporating all of the features included in the preferred embodiments. Therefore, the following claims are intended to define the scope of protection to be afforded the inventor, and the claims shall be deemed to include equivalent constructions insofar as they do not depart from the spirit and scope of the present invention.

A plurality of the following claims express certain elements as a means for performing a specific function, at times without the recital of structure or material. As the law demands, these claims shall be construed to cover not only the corresponding structure and material expressly described in the specification but also legally cognizable equivalents thereof.

I claim as deserving the protection of United States Letters Patent:

1. A thermochromatic label system for providing an indication of a temperature condition of contents of an inner volume of a vessel through convective heat transfer, the thermochromatic label system comprising:
 a thermochromatic label comprising a facestock with a first surface comprising a thermochromatic display surface and a second surface, a pattern of adhesive disposed on the second surface of the facestock, and a thermochromatic image disposed on the thermochromatic display surface of the facestock, the thermochromatic image comprising a thermochromatic material with an active temperature range;
 a vessel with an inner volume for retaining vessel contents in a temperature condition; and
 a lid for the vessel wherein the lid has a lid surface and a protuberating, preconfigured label retention structure within the lid surface for retaining the thermochromatic label, wherein the label retention structure comprises a raised protuberance on the lid, wherein the label retention structure defines a raised sub-volume within the lid and above the inner volume of the vessel when the lid is applied to the vessel;
 whereby the temperature condition of the vessel contents can be sensed and indicated by the thermochromatic label through convection without requiring direct or derivative conductive contact between the vessel contents and the thermochromatic label.

2. The thermochromatic label system of claim 1, wherein the protuberating, preconfigured label retention structure is contoured with a substantially conical shape, wherein the raised sub-volume defined by the label retention structure is liquid tight with the lid surface.

3. The thermochromatic label system of claim 2, wherein the facestock of the thermochromatic label has a lower portion, a mid-portion, and a peak portion, wherein the thermochromatic label is adapted to be applied to the substantially conical shape of the protuberating, preconfigured label retention structure, and wherein a first thermochromatic image is disposed on the peak portion of the facestock and a second thermochromatic image is disposed on the lower portion of the facestock.

4. The thermochromatic label system of claim 3, wherein the first thermochromatic image is formed from a thermochromatic material with a first temperature range and wherein the second thermochromatic image is formed from a thermochromatic material with a second temperature range.

5. The thermochromatic label system of claim 4, wherein the first and second temperature ranges are substantially the same.

6. The thermochromatic label system of claim 4, wherein the first and second temperature ranges are different.

7. The thermochromatic label system of claim 2, wherein the facestock of the thermochromatic label is contoured with a three-dimensional conical shape for being applied over the conical shape of the label retention structure.

8. The thermochromatic label system of claim 7, wherein the three-dimensional conical shape of the facestock of the thermochromatic label is liquid tight.

9. The thermochromatic label system of claim 1, wherein the facestock of the thermochromatic label is contoured with a three-dimensional conical shape.

10. The thermochromatic label system of claim 9, wherein the three-dimensional conical shape of the facestock of the thermochromatic label is liquid tight.

11. The thermochromatic label system of claim 1, wherein the protuberating, preconfigured label retention structure is contoured with a three-dimensional shape and wherein the raised sub-volume defined by the label retention structure is liquid tight with the lid surface.

12. The thermochromatic label system of claim 11, wherein the facestock of the thermochromatic label is contoured with a predetermined three-dimensional shape for being applied over the three-dimensional shape of the label retention structure.

13. The thermochromatic label system of claim 12, wherein the three-dimensional shape of the facestock of the thermochromatic label is liquid tight.

14. The thermochromatic label system of claim 1, wherein the thermochromatic label has a size and a peripheral edge shape and wherein the label retention structure has an upper portion with a size and peripheral shape in approximate correspondence to the size and peripheral edge shape of the thermochromatic label, and wherein the label retention structure has a peripheral wall portion that raises the upper portion above the lid surface.

15. The thermochromatic label system of claim 14, wherein the thermochromatic label and the label retention structures have rectangular peripheral shapes.

16. The thermochromatic label system of claim 1, further comprising a release liner releasably coupled to the thermochromatic label whereby the thermochromatic label can be released from the release liner and applied to the vessel.

17. The thermochromatic label system of claim 16, wherein plural thermochromatic labels are disposed in series on the release liner.

18. The thermochromatic label system of claim 1, wherein the adhesive disposed on the second surface of the facestock comprises a removable adhesive whereby the thermochromatic label can be applied to and removed from the vessel.

19. The thermochromatic label system of claim 1, wherein the lid comprises a fixed top of the vessel.

20. The thermochromatic label system of claim 1, wherein the lid comprises a selectively attached top for the vessel.

* * * * *